United States Patent
Tonet Fleig et al.

(10) Patent No.: US 12,151,808 B2
(45) Date of Patent: Nov. 26, 2024

(54) AIRCRAFT AND METHODS OF OPERATING THE SAME TO INCREASE DESCENT ANGLES THEREOF

(71) Applicant: HONEYWELL INTERNATIONAL INC., Charlotte, NC (US)

(72) Inventors: Pedro Alexandre Tonet Fleig, Brno (CZ); Ondrej Karas, Brno (CZ)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 288 days.

(21) Appl. No.: 17/820,302

(22) Filed: Aug. 17, 2022

(65) Prior Publication Data

US 2024/0059409 A1    Feb. 22, 2024

(51) Int. Cl.
| | |
|---|---|
| *B64C 29/00* | (2006.01) |
| *B64C 27/02* | (2006.01) |
| *B64U 10/20* | (2023.01) |
| *G05D 1/00* | (2024.01) |
| *G05D 1/485* | (2024.01) |
| *G05D 1/654* | (2024.01) |

(52) U.S. Cl.
CPC .......... *B64C 29/0025* (2013.01); *B64U 10/20* (2023.01); *G05D 1/102* (2013.01); *G05D 1/485* (2024.01); *G05D 1/654* (2024.01); *B64C 27/025* (2013.01)

(58) Field of Classification Search
CPC .............. B64C 29/0025; B64C 27/027; B64C 29/0033; F42B 10/14; B64U 10/13; F03G 3/00
See application file for complete search history.

(56) References Cited

U.S. PATENT DOCUMENTS

| | | | |
|---|---|---|---|
| 5,340,057 A | 8/1994 | Schmittle | |
| 5,765,777 A | 6/1998 | Schmittle | |
| 6,126,109 A * | 10/2000 | Barson | ............ F42B 10/14 |
| | | | 244/3.28 |
| 8,505,846 B1 | 8/2013 | Sanders, II | |
| 9,821,909 B2 | 11/2017 | Moshe | |

(Continued)

FOREIGN PATENT DOCUMENTS

| | | |
|---|---|---|
| CN | 108639333 B | 10/2018 |
| DE | 20303024 U1 | 8/2003 |

(Continued)

*Primary Examiner* — Yuri Kan
(74) *Attorney, Agent, or Firm* — Lorenz & Kopf, LLP

(57) ABSTRACT

Aircraft and methods of operating the aircraft to provide for increased descent angles. The aircraft includes a fuselage having fixed wings, a horizontal thrust source coupled to the fuselage and configured to selectively generate and supply horizontal thrust to the aircraft, a vertical thrust source coupled to the fuselage and configured to selectively generate and supply vertical thrust to the aircraft, the vertical thrust source including a vertical thrust rotor that is configured to selectively operate in a locked mode, in which the vertical thrust rotor cannot rotate freely in response to contact of airflow therewith, and an unlocked mode, in which the vertical thrust rotor can rotate freely in response to contact of airflow therewith, and a controller configured to selectively supply a command to the vertical thrust source that causes the vertical thrust rotor to operate in the unlocked mode.

16 Claims, 4 Drawing Sheets

(56) References Cited

U.S. PATENT DOCUMENTS

| | | | |
|---|---|---|---|
| 9,963,228 B2 | 5/2018 | McCullough et al. | |
| 11,149,719 B2 * | 10/2021 | Von Bargen | F03G 3/00 |
| 2004/0075017 A1 | 4/2004 | Sash | |
| 2018/0099742 A1 * | 4/2018 | Apkarian | B64C 29/0033 |
| 2019/0135420 A1 * | 5/2019 | Regev | B64U 10/13 |
| 2020/0140080 A1 * | 5/2020 | Regev | B64C 29/0033 |
| 2021/0024213 A1 * | 1/2021 | Regev | B64C 27/027 |

FOREIGN PATENT DOCUMENTS

| | | | |
|---|---|---|---|
| EP | 3901034 A1 | 10/2021 | |
| WO | 2014089604 A1 | 6/2014 | |
| WO | 2021030630 A2 | 2/2021 | |
| WO | 2021138470 A1 | 7/2021 | |

* cited by examiner

AIRCRAFT AND METHODS OF OPERATING THE SAME TO INCREASE DESCENT ANGLES THEREOF

TECHNICAL FIELD

The present invention generally relates to vertical take-off and landing (VTOL) aircraft, and more particularly relates to VTOL aircraft capable of using vertical thrust rotors to increase aerodynamic drag and thereby increase descent angles of the aircraft.

BACKGROUND

There is growing interest in Urban Air Mobility (UAM) concepts powered by Vertical Take-off and Landing (VTOL) vehicles, particularly electric or electric hybrid VTOLs (eVTOLs) vehicles. The National Aeronautics and Space Administration (NASA) defines UAM as a safe and efficient system for air passenger and cargo transportation within an urban area, inclusive of small package delivery and other urban Unmanned Aerial Systems (UAS) services, that supports a mix of onboard/ground-piloted and increasingly autonomous operations. Technologies that enable safe, quiet, efficient, affordable urban air operations at scale are emerging. Such technologies typically use small, heavily automated electric or hybrid vertical lift aircraft.

Fixed wing VTOL vehicles include aircraft having a fuselage with fixed wings and that are configured to selectively generate both horizontal thrust and vertical thrust. These aircraft may be operable in what is referred to herein as a wing-borne flight mode, in which lift is primarily provided by the fixed wings, and a rotor-borne flight mode, in which lift is primarily provided by vertical thrust sources of the aircraft (e.g., vertical thrust rotors). Typically, the wing-borne flight mode is utilized during long distance travel and the rotor-borne flight mode is utilized for take-offs, landings, and maneuvering in areas that are prohibitive to the wing-borne flight mode, such as maneuvering around objects.

While fixed wing VTOL vehicles provide many benefits and are of significant interest in the field of Urban Air Mobility, improvements to the vehicles are continuously pursued. For example, fixed wing VTOL vehicles are typically more fuel efficient in the wing-borne flight mode relative to the rotor-borne flight mode. As such, increasing the amount of time that the vehicles spend in wing-borne flight mode during a flight may improve efficiency and reduce operating costs.

Hence, there is a need for systems and methods that increase a duration during a flight that fixed wing VTOL vehicles can be in wing-borne flight mode. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An aircraft is provided that includes a fuselage having fixed wings, a horizontal thrust source coupled to the fuselage and configured to selectively generate and supply horizontal thrust to the aircraft, a vertical thrust source coupled to the fuselage and configured to selectively generate and supply vertical thrust to the aircraft, the vertical thrust source including a vertical thrust rotor that is configured to selectively operate in a locked mode, in which the vertical thrust rotor cannot rotate freely in response to contact of airflow therewith, and an unlocked mode, in which the vertical thrust rotor can rotate freely in response to contact of airflow therewith, and a controller in operable communication with at least the vertical thrust source, the controller configured to selectively supply a command to the vertical thrust source that causes the vertical thrust rotor to operate in the unlocked mode.

A method is provided for operating an aircraft. The method includes operating an aircraft to fly along a preprogrammed flight path by generating horizontal thrust with a horizontal thrust source and generating lift with fixed wings coupled to a fuselage of the aircraft, and selectively supplying a command to a vertical thrust source coupled to the fuselage that causes a vertical thrust rotor of the vertical thrust source transitions from operating in a locked mode to operating in an unlocked mode; wherein the vertical thrust rotor cannot rotate freely in response to contact of airflow therewith while operating in the locked mode, and in which the vertical thrust rotor can rotate freely in response to contact of airflow therewith while operating in the unlocked mode.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
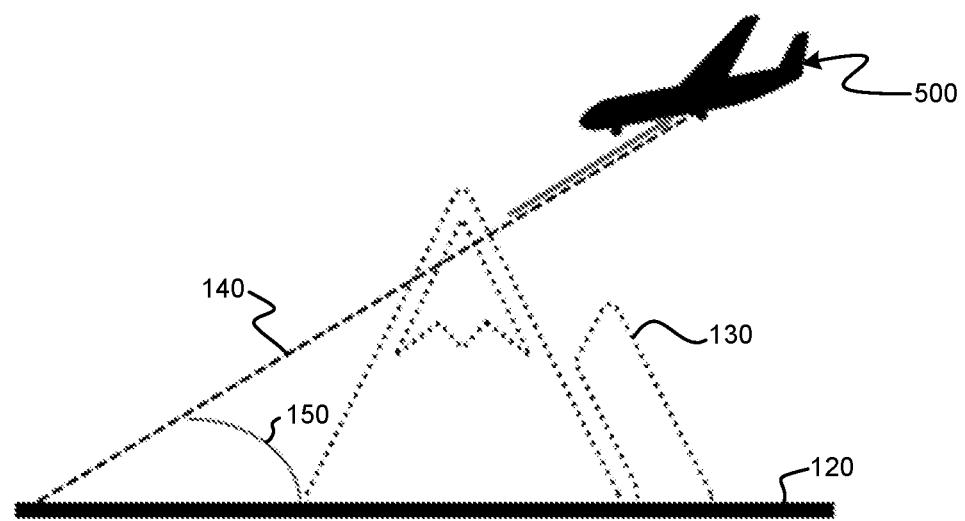
FIG. 1 is a side view schematically illustrating an aircraft descending with vertical thrust rotors thereof rotationally locked in accordance with various embodiments.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein allow for increasing descent angles for fixed-wing vertical take-off and landing (VTOL) aircraft. The VTOL aircraft may include any manned or unmanned fixed-wing object capable of flight and having vertical thrust sources. In some embodiments, the vertical thrust sources are dedicated vertical thrust sources, that is, the vertical thrust sources are not configured or capable of functioning as horizontal thrust sources. Examples of fixed-wing VTOL aircraft may include, but are not limited to, fixed-wing aerial vehicles (e.g., propeller-powered or jet powered), manned aircraft, unmanned aircraft (e.g., unmanned aerial vehicles, or UAVs), delivery drones, etc. The VTOL aircraft may be electric or electric hybrid VTOLs (eVTOLs) vehicles powered by electric or electric hybrid engines, or may powered by internal combustion engines or other non-electric power sources. In some embodiments, the VTOL aircraft includes electrically, mechanically, or pneumatically driven propellers. The general operation and construction of functional VTOL aircraft are well known in the art and therefore the discussion herein will focus primarily on control systems installed on the VTOL aircraft and methods of using the VTOL aircraft and equipment thereon, for example, for increasing aerodynamic drag during descent.

In various embodiments, the VTOL aircraft include a fuselage with fixed wings extending therefrom, at least one horizontal thrust source coupled to the fuselage configured to selectively generate horizontal thrust, and at least one vertical thrust source configured to selectively generate vertical thrust independently of the horizontal thrust source. These aircraft are selectively operable in a wing-borne flight mode wherein lift is primarily provided by the fixed wings, and a rotor-borne flight mode wherein lift is primarily provided by the vertical thrust source(s). Typically, the wing-borne flight mode is utilized during long distance travel and the rotor-borne flight mode is utilized for take-offs, landings, and maneuvering in areas that are inaccessible while in the wing-borne flight mode, such as maneuvering around objects. For convenience, the systems and methods will be discussed hereinafter in reference to an exemplary fixed wing VTOL aircraft 500 presented in FIG. 5. However, the VTOL aircraft 500 is a nonlimiting example and the systems and methods are applicable to various aircraft.

The VTOL aircraft 500 includes a fuselage 510 with fixed wings 540. A pair of horizontal thrust sources 520 are secured to the fixed wings 540, and a pair of vertical thrust sources 530 are coupled to the fuselage 510. In this example, the vertical thrust sources 530 each include a vertical thrust rotor 532 having rotor blades coupled to a rotatable shaft thereof.

The VTOL aircraft 500 may be operated in a wing-borne flight mode or a rotor-borne flight mode. For example, during take-offs and landings, the VTOL aircraft may be operated in the rotor-borne flight mode, in which a motor of the VTOL aircraft 500 is operated to rotate the shaft of the vertical thrust sources 530, thereby spinning the vertical thrust rotor 532 about an axis of rotation aligned with the shaft. In this manner, the rotor blades generate vertical thrust sufficient to lift or lower the VTOL aircraft 500 in a controlled manner. The VTOL aircraft 500 may transition from the rotor-borne flight mode to the wing-borne flight mode, for example, to travel extended distances more quickly and efficiently. While in the wing-borne flight mode, the horizontal thrust sources 520 generate the horizontal thrust to propel the VTOL aircraft 500 in a forward, horizontal direction thereof wherein airflow over the fixed wings 540 generate sufficient aerodynamic lift to maintain the VTOL aircraft airborne.

The VTOL aircraft 500 includes a controller 550 functionally connected to and configured to control vertical thrust rotor unlocking systems 534 associated with the vertical thrust sources 530. The vertical thrust rotor unlocking systems 534 are configured to selectively lock and/or unlock the vertical thrust rotors 532, that is, mechanically decouple the shaft or rotor blades from other components such that the vertical thrust rotors 532 may freely rotate, for example, due to airflow over the rotor blades. Therefore, the vertical thrust rotors 532 are configured to selectively operate in a locked mode, in which the vertical thrust rotors 532 cannot rotate freely in response to contact of airflow therewith, and an unlocked mode, in which the vertical thrust rotors 532 can rotate freely in response to contact of airflow therewith. The controller 550 is in operable communication with at least the vertical thrust sources 530, and is configured to selectively supply a command to the vertical thrust sources 530 that causes the vertical thrust rotors 532 to operate in the unlocked mode or the locked mode.

Figure 2:
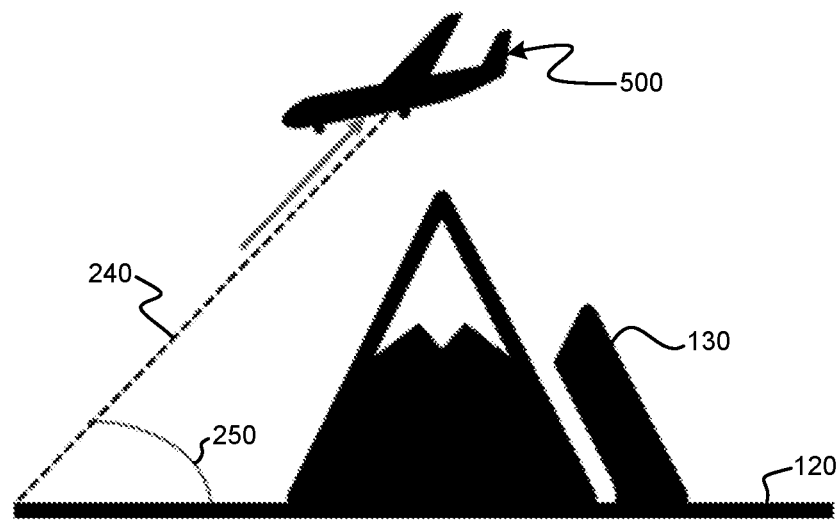
FIG. 2 is a side view schematically illustrating an aircraft descending with vertical thrust rotors thereof rotationally unlocked in accordance with various embodiments.

FIGS. 1 and 2 illustrate methods of operating the VTOL aircraft 500 in the wing-borne flight mode with the vertical thrust sources 530 in the locked mode and the unlocked mode, respectively. In these figures, the VTOL aircraft 500 is in flight and descending toward a surface 120. In FIG. 1, flight parameters of the VTOL aircraft 500, such as an aircraft descent velocity, a deceleration rate threshold, and a pitch of the fuselage 510, result in a flight path 140 and a flight path descent angle 150 that would cause the VTOL aircraft 500 to collide with an obstacle, in this instance, mountains 130. Other possible obstacles may include but are not limited to buildings, towers, bridges, and the like. Therefore, the VTOL aircraft 500 would normally be incapable of landing in the wing-borne flight mode, and would be required to maneuver around the mountains 130, if possible, prior to descending or would be required to transition into the rotor-borne flight mode. However, FIG. 2 illustrates an alternative option provided by the systems and methods herein. Specifically, the VTOL aircraft 500 may switch the vertical thrust sources 530 from the locked mode to the unlocked mode to increase the aerodynamic drag of the VTOL aircraft 500 without changing the aerodynamic velocity, horizontal thrust, or the pitch of the VTOL aircraft 500.

As the VTOL aircraft 500 descends, airflow over the rotor blades causes autorotation/windmilling of the vertical thrust rotors 532 which increases the aerodynamic drag of the VTOL aircraft 500. This increase in drag allows for an increase in descent angle 250 providing for a flight path 240 that allows the VTOL aircraft 500 to descend safely at a steeper decline without colliding with the mountains 130 (or other obstacles). As such, the systems and methods herein allow the VTOL aircraft 500 to remain in the wing-borne flight mode for a longer duration and may therefore improve fuel efficiency and/or reduce flight time.

Figure 3:
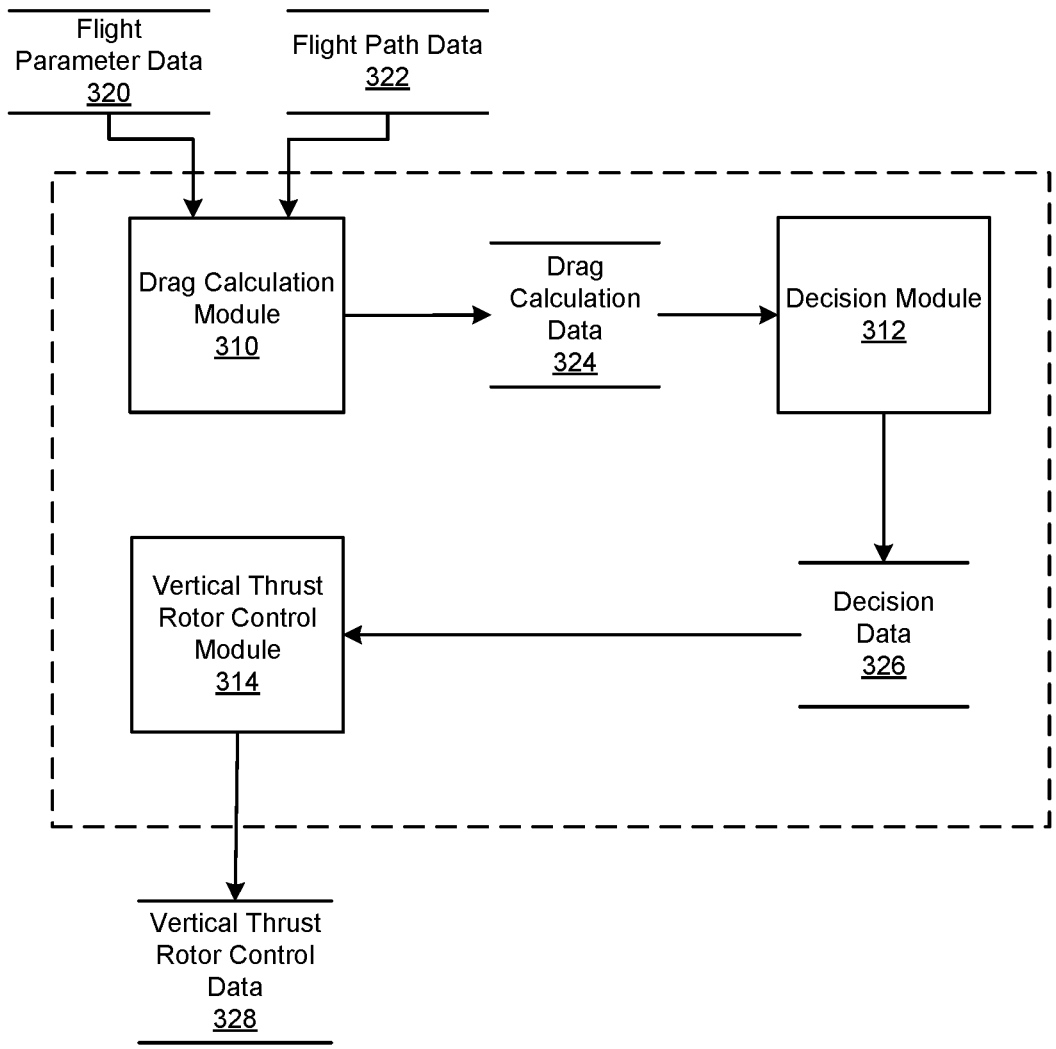
FIG. 3 is dataflow diagram illustrating elements of the vertical thrust locking system of the vehicle of FIGS. 1 and 2, in accordance with various embodiments.
Figure 5:
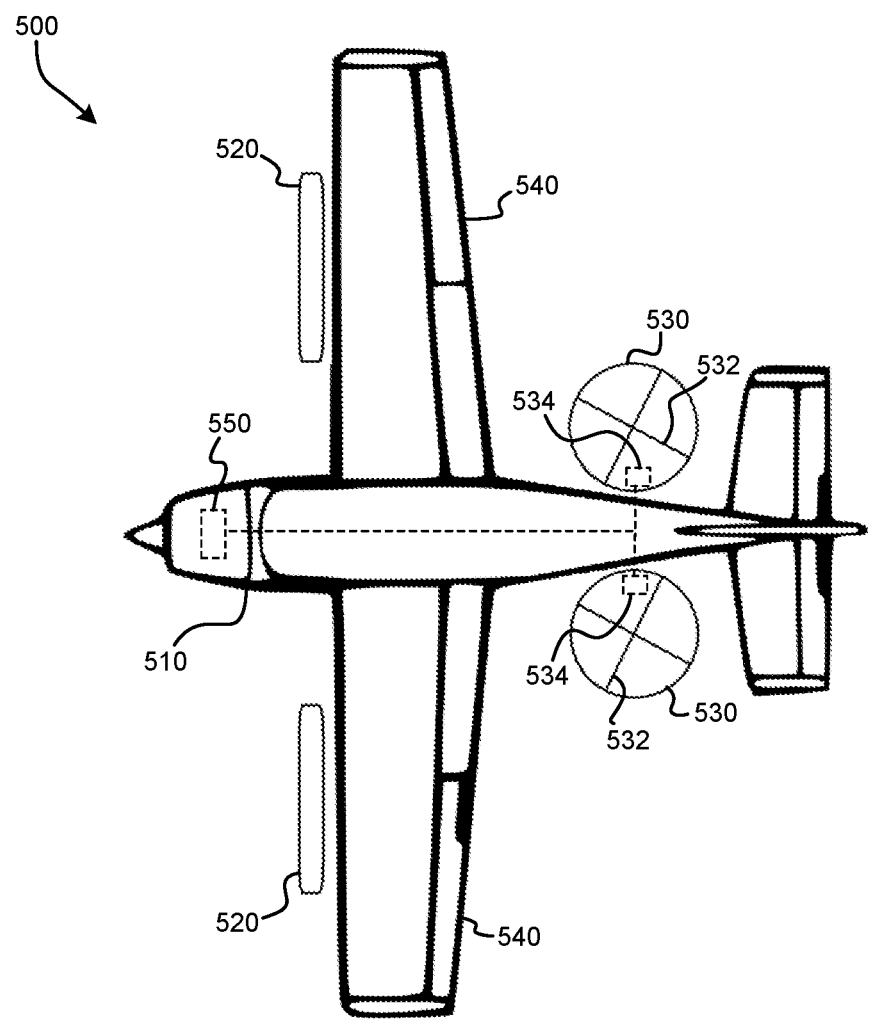
FIG. 5 is a top view illustrating an aircraft having dedicated vertical thrust rotors in accordance with various embodiments.

Referring now to FIG. 3, a dataflow diagram illustrates elements of the vertical thrust rotor unlocking system of FIG. 5 in accordance with various embodiments. As can be appreciated, various embodiments of the vertical thrust rotor unlocking system according to the present disclosure may include any number of modules embedded within the controller 550, which may be combined and/or further partitioned to similarly implement systems and methods described herein. Furthermore, inputs to the vertical thrust rotor unlocking system may be received from other control modules (not shown) associated with the VTOL aircraft 500, and/or determined/modeled by other sub-modules (not shown) within the controller 550. Furthermore, the inputs might also be subjected to preprocessing, such as sub-sampling, noise-reduction, normalization, feature-extraction, missing data reduction, and the like. In various embodiments, the vertical thrust rotor unlocking system includes a drag calculation module 310, a decision module 312, and a vertical thrust rotor control module 314.

In various embodiments, the drag calculation module 310 receives as input flight parameter data 320 and flight path data 322. The flight parameter data 320 includes various data indicating flight parameters of the VTOL aircraft 500, such as the aircraft descent velocity, the deceleration rate threshold, and/or the pitch of the fuselage 510. The flight path data 322 includes various data indicating information such as the commanded flight path, descent angle, and/or landing location. Optionally, the flight path data 322 may include information relating to the environment. This data may include obstacles, weather conditions, or other information that may affect the aerodynamic drag of the VTOL aircraft 500 during descent. The flight parameter data 320 and the flight path data 322 may be based on operational limitations inherent to the VTOL aircraft 500, preprogrammed conditions and directions relating to the operation of the VTOL aircraft 500, and/or user input. The flight parameter data 320 and the flight path data 322 may be received by the controller 550 from a data storage device onboard or in remote communication with the VTOL aircraft 500, and/or generated by and received from one or more controls, systems, devices, or sensors onboard the VTOL aircraft 500.

The drag calculation module 310 determines whether the aerodynamic drag of the VTOL aircraft 500 needs to be increased to achieve a preprogrammed flight path and/or descent angle based on the flight parameter data 320 and the flight path data 322. In various embodiments, the drag calculation module 310 may determine a maximum safe descent angle based on the current or expected aerodynamic drag of the VTOL aircraft 500.

In various embodiments, the decision module 312 receives as input drag calculation data 324 generated by the drag calculation module 310. The drag calculation data 324 includes various data indicating, for example, the required aerodynamic drag necessary to achieve the preprogrammed flight path and/or descent angle, the current or expected aerodynamic drag of the VTOL aircraft 500, and/or the maximum safe descent angle achievable based on, at least in part, the flight parameter data 320. In various embodiments, the drag calculation data 324 may include some or all of the flight parameter data 320 and/or the flight path data 322.

The decision module 312 performs an analysis of the drag calculation data 324 to determine whether the aerodynamic drag of the VTOL aircraft 500 should be increased to achieve the preprogrammed flight path and/or descent angle. In various embodiments, the decision module 312 may determine that the drag should be increased in response to the determined necessary drag being greater than a current or expected drag of the VTOL aircraft 500. In various embodiments, the decision module 312 may determine that the drag should be increased in response the preprogrammed descent angle being greater than the determined maximum safe descent angle.

In various embodiments, the vertical thrust rotor control module 314 receives as input decision data 326 generated by the decision module 312. The decision data 326 includes various data indicating a decision as to whether the aerodynamic drag of the VTOL aircraft 500 should be increased during descent thereof.

The vertical thrust rotor control module 314 generates and transmits a command to the vertical thrust sources 530 and/or the vertical thrust rotor unlocking systems 534 thereof in response to a decision communicated in the decision data 326 that the aerodynamic drag should be increased. The command instructs or otherwise causes the vertical thrust rotor unlocking systems 534 to unlock the vertical thrust rotors 532 and thereby operate in the unlocked mode. In this manner, the rotation of the vertical thrust rotors 532 increase the drag of the VTOL aircraft 500 at least to the determined necessary drag during descent thereof to achieve the preprogrammed descent angle and flight path.

Figure 4:
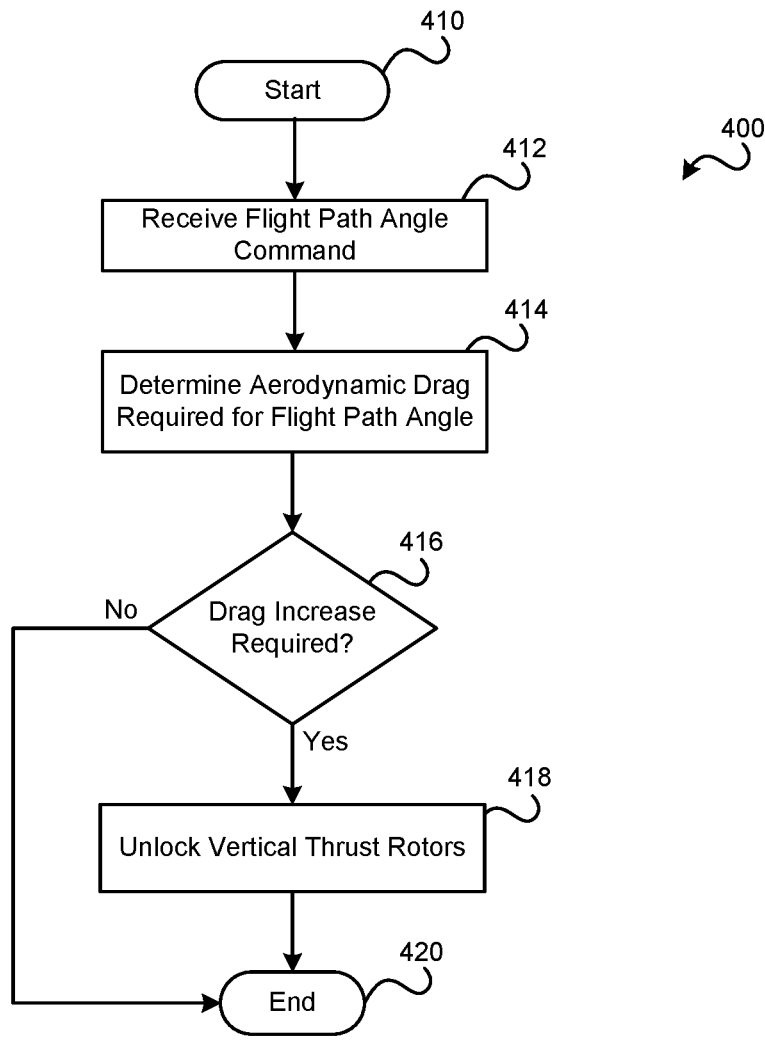
FIG. 4 is a flowchart of a process for locking/unlocking the vertical thrust rotors as performed by the vertical thrust locking system of the vehicle of FIGS. 1 and 2, in accordance with various embodiments.

With reference now to FIG. 4, a flowchart provides a method 400 for increasing the flight path descent angle of the VTOL aircraft 500 as performed by the vertical thrust rotor unlocking system, in accordance with exemplary embodiments. As can be appreciated in light of the disclosure, the order of operation within the method 400 is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the VTOL aircraft 500.

In one example, the method 400 may begin at 410. At 412, the method 400 includes receiving a flight path, flight path angle command, and/or a flight path descent angle. At 414, the method 400 includes determining the aerodynamic drag and/or change in descent angle required for the received flight path, flight path angle command, and/or flight path descent angle. A decision as to whether the drag and/or the current/expected descent angle needs to be increased is made at 416. If the drag and/or the current/expected descent angle are adequate to achieve the preprogramed flight path and/or descent angle, then the vertical thrust sources 530 of the VTOL aircraft 500 may continue to operate in the locked mode. However, if the decision is made that the drag and/or the current/expected descent angle are inadequate and need to be increased to achieve the preprogramed flight path, flight path angle command, and/or descent angle, then the vertical thrust sources 530 may be transitioned from the locked mode to the unlocked mode during descent at 418 such that the vertical thrust rotors 532 are allows to freely rotate. The method 400 may end at 420.

The term "controller," as appearing herein, broadly encompasses those components utilized to carry-out or otherwise support the processing functionalities of the vertical thrust rotor unlocking system. Accordingly, the controller 550 can encompass or may be associated with any number of individual processors, flight control computers, navigational equipment pieces, computer-readable memories, power supplies, storage devices, interface cards, and other standardized components. In various embodiments, the controller 550 includes or cooperates with at least one firmware and software program (generally, computer-readable instructions that embody an algorithm) for carrying-out the various process tasks, calculations, and control/display functions described herein. During operation, the controller 550 may be programmed with and execute the at least one firmware or software program to thereby perform the various process steps, tasks, calculations, and control/display functions described herein.

The controller 550 may exchange data with one or more external sources to support operation of the vertical thrust rotor unlocking system in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The controller 550 may include at least one processor, a communication bus, and a computer readable storage device or media. The processor performs the computation and control functions of the controller 550. The processor can be any custom made or commercially available processor, a central processing unit (CPU), a graphics processing unit (GPU), an auxiliary processor among several processors associated with the controller 550, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 550 in controlling the VTOL aircraft 500. The bus serves to transmit programs, data, status and other information or signals between the various components of the VTOL aircraft 500. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensor system, perform logic, calculations, methods and/or algorithms, and generate data based on the logic, calculations, methods, and/or algorithms. Although only one controller 550 is shown in FIG. 5, embodiments of the VTOL aircraft 500 can include any number of controllers 550 that communicate over any suitable communication medium or a combination of communication mediums and that cooperate to process the sensor signals, perform logic, calculations, methods, and/or algorithms, and generate data.

As can be appreciated, that the controller 550 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. The computer system of the controller 550 may be coupled to or may otherwise utilize one or more remote computer systems and/or other control systems.

Flight parameter sensors and geospatial sensors onboard the VTOL aircraft 500 may supply various types of data or measurements to the controller 550. In various embodiments, the geospatial sensors supply, without limitation, one or more of: Flight Path Angle (FPA) measurements, airspeed data, groundspeed data, vertical speed data, vertical acceleration data, altitude data, attitude data including pitch data and roll measurements, yaw data, data related to weight of the VTOL aircraft 500, time/date information, heading information, data related to atmospheric conditions, flight path data, flight track data, radar altitude data, geometric altitude data, wind speed and direction data. Further, in certain embodiments, the controller 550 and the other components of the VTOL aircraft 500 may be included within or cooperate with any number and type of systems commonly deployed onboard aircraft including, for example, an FMS, an Attitude Heading Reference System (AHRS), an Instrument Landing System (ILS), and/or an Inertial Reference System (IRS), to list but a few examples.

Optionally, the controller 550 may be in functional communication with a display device, which may optionally be part of a larger on-board display system, a computer-readable storage media or memory, an input interface, and/or ownship data sources including, for example, an array of flight system status and geospatial sensors. The controller 550 may be separate from or integrated within: a flight management system (FMS) and/or a flight control system (FCS).

If the controller 550 is functionally coupled to a display device, the display device can include any number and type of image generating devices on which one or more avionic displays may be produced. If the VTOL aircraft 500 is a manned urban air mobility vehicle (UAMV), the display device may be affixed to the static structure of a cockpit thereof as, for example, a Head Down Display (HDD) or Head Up Display (HUD) unit. Alternatively, the display device may assume the form of a movable display device (e.g., a pilot-worn display device) or a portable display device, such as an Electronic Flight Bag (EBB), a laptop, or a tablet computer carried into the cockpit by a pilot.

In various embodiments, a human-machine interface, such as the above-described touch screen display, may be implemented as an integration of a pilot input interface and a display device. Via various display and graphics systems processes, the controller 550 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft comprising:
a fuselage having fixed wings;
a horizontal thrust source coupled to the fuselage and configured to selectively generate and supply horizontal thrust to the aircraft;
a vertical thrust source coupled to the fuselage and configured to selectively generate and supply vertical thrust to the aircraft, the vertical thrust source including a vertical thrust rotor that is configured to selectively operate in a locked mode, in which the vertical thrust rotor cannot rotate freely in response to contact of airflow therewith, and an unlocked mode, in which the vertical thrust rotor can rotate freely in response to contact of airflow therewith; and
a controller in operable communication with at least the vertical thrust source, the controller configured to selectively supply a command to the vertical thrust source that causes the vertical thrust rotor to operate in the unlocked mode.

2. The aircraft of claim 1, wherein the controller supplies the command to the vertical thrust source during a descent of the aircraft to increase aerodynamic drag of the aircraft through autorotation/windmilling of the vertical thrust rotor and thereby increase a descent angle of the aircraft.

3. The aircraft of claim 1, wherein the controller is configured to supply the command to the vertical thrust source based on a flight path descent angle and an aircraft descent velocity and a deceleration rate threshold.

4. The aircraft of claim 1, wherein the controller is configured to, by a processor:
receive a preprogramed flight path descent angle for landing the aircraft;
determine a required drag based on an aircraft descent velocity and a deceleration rate threshold, wherein the required drag is necessary to achieve the preprogramed flight path descent angle; and
supply the command to the vertical thrust source in response to the determined required drag being greater than a current or expected drag of the aircraft,
wherein rotation of the vertical thrust rotor increases the current drag of the aircraft to the determined required drag.

5. The aircraft of claim 4, wherein the controller is configured to, by a processor:
receive a preprogramed flight path descent angle for landing the aircraft;
determine a maximum safe descent angle based on an aircraft descent velocity and a deceleration rate threshold; and
supply the command to the vertical thrust source in response to the determined maximum safe descent angle being less than the preprogramed flight path descent angle,
wherein rotation of the vertical thrust rotor increases the current drag of the aircraft to the determined required drag.

6. The aircraft of claim 1, wherein the aircraft is a fixed wing vertical take-off and landing vehicle.

7. The aircraft of claim 1, wherein the vertical thrust source is a dedicated vertical thrust source.

8. The aircraft of claim 1, wherein the aircraft is operable in a wing-borne flight mode wherein lift is primarily provided by the fixed wings, and a rotor-borne flight mode wherein lift is primarily provided by the vertical thrust source.

9. A method of operating an aircraft, the method comprising:
operating the aircraft to fly along a preprogrammed flight path by generating horizontal thrust with a horizontal thrust source and generating lift with fixed wings coupled to a fuselage of the aircraft; and
selectively supplying a command to a vertical thrust source coupled to the fuselage that causes a vertical thrust rotor of the vertical thrust source transitions from operating in a locked mode to operating in an unlocked mode,
wherein the vertical thrust rotor cannot rotate freely in response to contact of airflow therewith while operating in the locked mode, and in which the vertical thrust rotor can rotate freely in response to contact of airflow therewith while operating in the unlocked mode.

10. The method of claim 9, wherein the command is supplied to the vertical thrust source during a descent of the aircraft to increase aerodynamic drag of the aircraft through autorotation/windmilling of the vertical thrust rotor and thereby increase a descent angle of the aircraft.

11. The method of claim 9, wherein the command is supplied to the vertical thrust source based on a flight path descent angle and an aircraft descent velocity and a deceleration rate threshold.

12. The method of claim 9, further comprising:
receiving a preprogramed flight path descent angle for landing the aircraft;
determining a required drag based on an aircraft descent velocity and a deceleration rate threshold, wherein the required drag is necessary to achieve the preprogramed flight path descent angle; and
supplying the command to the vertical thrust source in response to the determined required drag being greater than a current or expected drag of the aircraft,
wherein rotation of the vertical thrust rotor increases the current drag of the aircraft to the determined required drag.

13. The method of claim 12, further comprising:
receiving a preprogramed flight path descent angle for landing the aircraft;
determining a maximum safe descent angle based on an aircraft descent velocity and a deceleration rate threshold; and
supplying the command to the vertical thrust source in response to the determined maximum safe descent angle being less than the preprogramed flight path descent angle,
wherein rotation of the vertical thrust rotor increases the current drag of the aircraft to the determined required drag.

14. The method of claim 9, wherein the aircraft is a fixed wing vertical take-off and landing vehicle.

15. The method of claim 9, wherein the vertical thrust source is a dedicated vertical thrust source.

16. The method of claim 9, wherein operating the aircraft to fly along the preprogrammed flight path includes operating the aircraft in a wing-borne flight mode wherein lift is primarily provided by the fixed wings, the method further comprising operating the aircraft in a rotor-borne flight mode wherein lift is primarily provided by the vertical thrust source.

* * * * *